US 8,417,647 B2

(12) United States Patent
Fujioka et al.

(10) Patent No.: US 8,417,647 B2
(45) Date of Patent: Apr. 9, 2013

(54) METHOD FOR CONTROLLING TRANSACTION MANAGEMENT SERVER, TRANSACTION MANAGEMENT SERVER AND PROGRAM

(75) Inventors: Kei Fujioka, Minato-ku (JP); Hiroki Natori, Minato-ku (JP)

(73) Assignee: Mitsui-Soko Co., Ltd., Tokyo (JP)

( * ) Notice: Subject to any disclaimer, the term of this patent is extended or adjusted under 35 U.S.C. 154(b) by 1431 days.

(21) Appl. No.: 11/222,728

(22) Filed: Sep. 8, 2005

(65) Prior Publication Data

US 2007/0022030 A1 Jan. 25, 2007

(30) Foreign Application Priority Data

Jul. 22, 2005 (JP) .................................. 2005-213365

(51) Int. Cl.
  G06Q 30/00 (2012.01)
  G06Q 10/00 (2012.01)
  G06Q 40/00 (2012.01)
  G06Q 90/00 (2006.01)
  G06F 19/00 (2011.01)

(52) U.S. Cl. ............ 705/331; 705/28; 705/35; 705/330; 705/339; 235/385

(58) Field of Classification Search ........................ None
See application file for complete search history.

(56) References Cited

U.S. PATENT DOCUMENTS

| | | | | |
|---|---|---|---|---|
| 6,934,692 B1 * | 8/2005 | Duncan | .......................... | 705/35 |
| 6,937,992 B1 * | 8/2005 | Benda et al. | ................. | 705/7.26 |
| 6,974,928 B2 * | 12/2005 | Bloom | .......................... | 209/583 |
| 6,996,538 B2 * | 2/2006 | Lucas | .............................. | 705/28 |
| 7,082,412 B1 * | 7/2006 | Treider et al. | ................... | 705/38 |
| 7,257,552 B1 * | 8/2007 | Franco | ............................ | 705/28 |
| 7,293,707 B2 * | 11/2007 | Penkar et al. | ................. | 235/385 |

(Continued)

FOREIGN PATENT DOCUMENTS

| | | |
|---|---|---|
| JP | 2004-185219 | 7/2004 |
| JP | 2005-055935 | 3/2005 |

OTHER PUBLICATIONS

3PLs serve up supply chain innovation, Thomas A Foster, Logistics Management and Distribution Report, Nov. 1999, vol. 38, Iss. 11; p. 1-4.*

Form 10-K, Circle International Group, Inc., Apr. 1, 2000, Securities and Exchange Commission, pp. 1-7.*

(Continued)

*Primary Examiner* — Gregory Johnson

(74) *Attorney, Agent, or Firm* — SoCal IP Law Group LLP; Steven C. Sereboff; John E. Gunther

(57) ABSTRACT

A control method, for a transaction management server of a transaction administrator administrating commodity transactions between a seller and a buyer, comprises transmitting to a forwarder terminal an instruction to transport a commodity received along with price information of the commodity from a seller terminal; writing the price information into a database; receiving from the forwarder terminal and writing into the database the number of the waybill issued when the commodity is loaded into transportation by the forwarder; transmitting to the seller terminal information indicating that the transaction administrator has made an alternative payment for the commodity; receiving from the forwarder terminal and writing into the database the number of the waybill put on the commodity having arrived at a destination and commodity identification information; receiving the commodity identification information of the commodity delivered to the buyer from the forwarder terminal, and transmitting to a buyer terminal a payment request based on the price information stored in association with the commodity identification information.

5 Claims, 6 Drawing Sheets

U.S. PATENT DOCUMENTS

| | | | |
|---|---|---|---|
| 7,653,457 B2* | 1/2010 | Bloom | 700/226 |
| 2002/0019761 A1* | 2/2002 | Lidow | 705/10 |
| 2002/0099655 A1* | 7/2002 | Melchior et al. | 705/40 |
| 2002/0123918 A1* | 9/2002 | Brown et al. | 705/7 |
| 2002/0156707 A1* | 10/2002 | Reid et al. | 705/28 |
| 2002/0165747 A1* | 11/2002 | Shriver et al. | 705/8 |
| 2003/0018546 A1* | 1/2003 | Ayala et al. | 705/28 |
| 2003/0023501 A1* | 1/2003 | Alling | 705/26 |
| 2003/0074273 A1* | 4/2003 | Miller et al. | 705/26 |
| 2003/0110104 A1* | 6/2003 | King et al. | 705/28 |
| 2003/0115072 A1* | 6/2003 | Manucha et al. | 705/1 |
| 2003/0171962 A1* | 9/2003 | Hirth et al. | 705/7 |
| 2003/0220863 A1* | 11/2003 | Holm et al. | 705/37 |
| 2004/0064382 A1* | 4/2004 | Negron | 705/28 |
| 2004/0084527 A1* | 5/2004 | Bong et al. | 235/385 |
| 2004/0103047 A1* | 5/2004 | Park et al. | 705/28 |
| 2004/0148206 A1* | 7/2004 | Matsumoto et al. | 705/6 |
| 2004/0153359 A1* | 8/2004 | Ho et al. | 705/10 |
| 2004/0162768 A1* | 8/2004 | Snyder et al. | 705/28 |
| 2004/0172368 A1* | 9/2004 | Johnson | 705/64 |
| 2004/0236645 A1* | 11/2004 | Tien | 705/28 |
| 2004/0254862 A1* | 12/2004 | Luo et al. | 705/28 |
| 2004/0267677 A1* | 12/2004 | Mitsuoka et al. | 705/400 |
| 2005/0060246 A1* | 3/2005 | Lastinger et al. | 705/28 |
| 2005/0060247 A1* | 3/2005 | Tien | 705/28 |
| 2005/0065864 A1* | 3/2005 | Mizutani et al. | 705/35 |
| 2005/0091129 A1* | 4/2005 | Tien | 705/28 |
| 2005/0103842 A1* | 5/2005 | Bong et al. | 235/385 |
| 2005/0131785 A1* | 6/2005 | Yap | 705/35 |
| 2005/0149453 A1* | 7/2005 | Amling et al. | 705/60 |
| 2005/0177435 A1* | 8/2005 | Lidow | 705/22 |
| 2005/0246240 A1* | 11/2005 | Padilla | 705/26 |
| 2005/0283404 A1* | 12/2005 | Young | 705/22 |
| 2005/0288986 A1* | 12/2005 | Barts et al. | 705/9 |
| 2006/0167762 A1* | 7/2006 | Hahn-Carlson | 705/26 |
| 2006/0173750 A1* | 8/2006 | Naley et al. | 705/26 |
| 2007/0022030 A1* | 1/2007 | Fujioka et al. | 705/35 |

OTHER PUBLICATIONS

Shipper Financing Evolves, Expands, Awaiting Its Boom (Many logistics providers are moving into the area of shipper finance because of the increasing demand in supply chain management solutions); Mungai, David; World Trade, p. 70-71; Jan. 2000; 3-pages.*

The rise in global sourcing and logistics implications for shippers (Key benefit from global sourcing is the ability to achieve significant cost savings from lower logistics and inventory carrying costs); McGowan, Kevin; Transportation & Distribution, v 38, n 10, p. 83-87; Oct. 1997; 6-pages.*

Transportation Issues for Supply Chain Management; Helms, Marilyn M; Dileepan, Parthasararti; Business Forum, v27, n1, pp. 8-13; 2005; 7-pages.*

Supply chain logistics risks From the back room to the board room; Cavinato, Joseph L; International Journal of Physical Distribution & Logistics Management, v34, n5, pp. 383-387; 2004; 5-pages.*

International Trade and Logistics in 2004 for Retailers and Their Suppliers; Anonymous; Chain Store Age, v80, n8, pp. 2B-11B; Aug. 2004; 11-pages.*

Quality assurance in the maritime port logistics chain: the case of Valencia, Spain; Lopez, Raul Compes; Poole, Nigel; Supply Chain Management, v3, n1, pp. 33; 1998; 16-pages.*

Bonded Warehousing: Saves Money and Increases Efficiency; Goldstein, Mark A.; Business Credit, v94, n9, pp. 19-21; Oct. 1992; 3-pages.*

Japan Patent Office, Notification of Reason for Rejection, mail date Jul. 15, 2008, for Application No. JP2005-213365 filed Jul. 22, 2005.

* cited by examiner

TRANSACTION MANAGEMENT DATABASE

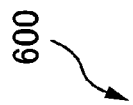
600

| No | Vendor | Maker | PRODUCT NAME | DELIVERY QUANTITY | DESIRED DELIVERY DATE | WAREHOUSING QUANTITY | LOADING-POINT WAREHOUSING # | LOADING-POINT WAREHOUSING DATE | TRANSPORTED QUANTITY | Invoice# |
|---|---|---|---|---|---|---|---|---|---|---|
| 0001 | COMPANY A | COMPANY B | ITEM-A | 1000 | MAY 1 | 500 | LOADING-POINT WAREHOUSING #-1 | APRIL 15 | 300 | INV#-1 |
| ... | | | | | | | | | | |

| ALTERNATIVE PAYMENT AMOUNT | ALTERNATIVE PAYMENT # | DUE-DATE | FINANCING # | FINANCING AMOUNT | DISCHARGE-POINT WAREHOUSING # | DISCHARGE-POINT WAREHOUSING DATE | D/O# |
|---|---|---|---|---|---|---|---|
| 30000 | A. P. #-1 | JUNE 30 | FINANCING #-1 | 30000 | DISCHARGE-POINT WAREHOUSING #-5 | APRIL 25 | D/O#-1 |
| | | | | | | | |

| LEAVING QUANTITY | LEAVING DATE | LEAVING COMPLETION INFORMATION | LEAVING AMOUNT | INDIVIDUAL BILL # | ALTERNATIVE PAYMENT BALANCE |
|---|---|---|---|---|---|
| 10 | APRIL 27 | COMPLETED | 1000 | I. B. #-1 | 29000 |
| | | | | | |

Fig.5

METHOD FOR CONTROLLING TRANSACTION MANAGEMENT SERVER, TRANSACTION MANAGEMENT SERVER AND PROGRAM

CROSS-REFERENCE TO RELATED APPLICATIONS

The present application claims priority from Japanese Patent Application No. 2005-213365 filed on Jul. 22, 2005, which is herein incorporated by reference.

BACKGROUND OF THE INVENTION

1. Field of the Invention

The present invention relates to a method for controlling a transaction management server, a transaction management server and a program which enable implementation of VMI without increasing burdens on commodity sellers.

2. Description of the Related Art

Today's promotion of logistical efficiency is supported by advanced information technologies. The promotion of logistical efficiency has brought about various advantages such as reductions of delivery periods and inventory.

Conditions of transactions between a seller and a buyer are determined by a contract between the interested parties. Typically, FOB (Free On Board) is often applied, and in this case, ownership of a commodity is passed from the seller to the buyer when the commodity is loaded in transportation means such as a ship or an airplane at the location of loading the commodity, and the buyer will be responsible for all costs and risks after that. Therefore, the buyer will own the commodity loaded in the transportation means as their own property and will take self-responsibility for inventory management. Typically, payment to the seller for the commodity is conducted when the commodity is loaded into the transportation means.

Recently, for transaction of commodities, a technique called VMI (Vendor Managed Inventory) has been being widespread where commodity inventory management is performed by the seller. In VMI, the seller has ownership of a commodity until the buyer makes shipment of the commodity from the warehouse at the discharge point. Therefore, the seller takes self-responsibility for inventory management of the commodity as their own property. In this way, the buyer can supply a necessary quantity of a commodity to the market when needed, without caring about the inventory. As to the payment, the buyer need only make payment only for a quantity of the commodity shipped from the warehouse.

In this way, nowadays, transactions of commodities are performed with various techniques, and various technologies are developed for the techniques. See, for example, Japanese Patent Application Laid-Open Publication No. 2002-49668.

However, when implementing VMI, while sellers of commodities have the advantage that the sellers can perform commodity inventory management and transportation management by themselves, burdens on the sellers are increased in most cases. Also, collection of payments from buyers will be delayed. Hence, even if a buyer wants to have VMI implemented, the VMI may not be implemented depending on situations of the seller.

Therefore, a technology is desired for enabling implementation of VMI without increasing burdens on sellers.

SUMMARY OF THE INVENTION

The present invention was conceived in consideration of the above problems and it is a primary object of the present invention to provide a method for controlling a transaction management server, a transaction management server and program enabling implementation of VMI without increasing burdens on commodity sellers.

In order to achieve the above and other objects, according to an aspect of the present invention there is provided a control method for a transaction management server of a transaction administrator administrating commodity transactions between a seller and a buyer, the transaction management server being communicatively connected to a seller terminal of the seller of a commodity, to a buyer terminal of the buyer of the commodity and to a forwarder terminal of a forwarder to transport the commodity, the control method comprising the steps of the transaction management server receiving a transportation instruction to transport the commodity along with information indicating a price of the commodity from the seller terminal; writing into a database the information indicating the price of the commodity in association with the received transportation instruction; transmitting the transportation instruction to the forwarder terminal; receiving from the forwarder terminal, identification information of a waybill issued when the commodity is loaded into transportation means by the forwarder according to the transportation instruction; writing into the database the received identification information of the waybill in association with the transportation instruction; transmitting to the seller terminal, information indicating that the transaction administrator has made a payment for the commodity to the seller on behalf of the buyer; receiving from the forwarder terminal, commodity identification information assigned to the commodity by the forwarder when the commodity has arrived at a destination along with the identification information of the waybill put on the commodity; writing into the database the received commodity identification information in association with the transportation instruction stored in association with the received identification information of the waybill; receiving a commodity delivery request from the buyer terminal;

transmitting the commodity delivery request to the forwarder terminal; receiving from the forwarder terminal the commodity identification information of the commodity delivered by the forwarder to the buyer; and transmitting to the buyer terminal a payment request asking the payment for the commodity paid by the transaction administrator on behalf of the buyer, based on the information indicating the price of the commodity stored in the database in association with the received commodity identification information.

According to the aspect, the seller of the commodity can receive the payment when the commodity is loaded into the transportation means, as is the case with FOB. Hence, VMI can be implemented without increasing burdens on the seller. Also, the buyer need only make a payment only for a quantity of the commodity shipped from a warehouse, as is the case with VMI. The buyer can supply a necessary quantity of the commodity to the market when needed, without caring about the inventory. In this way, according to the embodiment, VMI can be implemented without increasing burdens on the commodity seller. Hereinafter, this embodiment is referred to as FMI (Forwarder Managed Inventory).

The waybill may be a document of value assuring the exchange for the commodity, and the transaction management server may transmit to the seller terminal, information indicating that the payment for the commodity to the seller has been made on behalf of the buyer by the transaction administrator financed by a finance institution on security of receivables based on the waybill.

Thus, the transaction administrator can get efficiently financed for making payment for the commodity to the seller.

The transportation instruction may be a shipping instruction, the transportation means may be a vessel or an airplane, and the waybill may be a bill of lading or an air waybill.

Hence, FMI can be implemented also when the commodity is exported or imported using a vessel or an airplane.

The database may store information indicating a difference between a money amount paid by the transaction administrator to the seller and a money amount paid by the buyer to the transaction administrator.

Thus, the management can be facilitated of the remainder to be paid by the commodity buyer to the transaction administrator.

VMI can be implemented without increasing burdens on sellers.

Other problems and solutions thereof disclosed by the application will become clear from the following description of the preferred embodiment when taken in conjunction with the accompanying drawings.

BRIEF DESCRIPTION OF THE DRAWINGS

FIG. 5 is a view showing a transaction management database according to the embodiment;

DETAILED DESCRIPTION OF THE INVENTION

===Outline of FMI===

Figure 1:
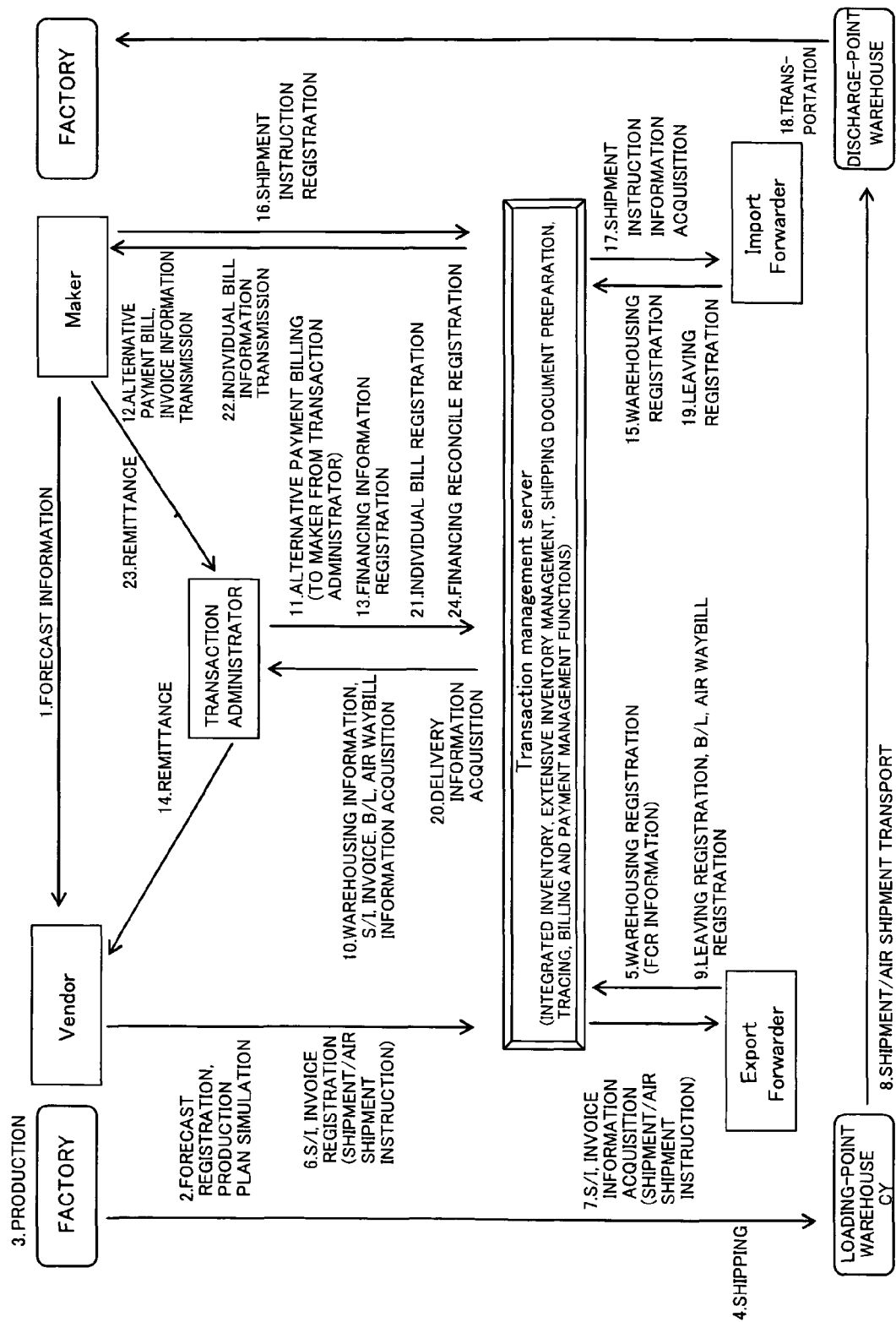
FIG. 1 is a diagram showing an outline of transactions in FMI according to an embodiment.

FIG. 1 shows a flow of a commodity transaction performed using FMI.

In FIG. 1, a maker is a buyer purchasing parts (commodities) from a vendor. The maker assembles the purchased parts into products to be sold.

On the other hand, the vender is a seller fabricating and delivering the parts to the maker. The vender produces the parts based on information about the production plan of the product obtained from the maker (Forecast information) and delivers the parts to the maker.

While in the following description it is assumed that the maker's factory and the vendor's factory are located in different countries, the factories may be located in the same country.

The parts to be delivered to the maker are transported by a forwarder from a warehouse in the country where the vendor's factory is located (a loading-point warehouse) to a warehouse in the country where the maker's factory is located (a discharge-point warehouse).

In FMI, as is the case with VMI, when shipping from the discharge-point warehouse to the maker, the parts are property of the vender until the parts are brought out from the discharge-point warehouse. Therefore, the inventory management of the parts is performed in the discharge-point warehouse under the responsibility of the vendor. The obligation of the payment is generated when the parts are brought out from the discharge-point warehouse.

The transportation from the loading-point warehouse to the discharge-point warehouse may be performed with vessels, airplanes, or with cargo trucks or trains.

The transportation from the loading-point warehouse to the discharge-point warehouse may be performed by the same forwarder or a plurality of forwarders. When performed by the same forwarder, the same forwarder conducts all of an export procedure at the loading point, an import procedure at the discharge point and the transportation of the parts via various transportation means such as vessels. When performed by a plurality of different forwarders, the different forwarders respectively perform the export procedure at the loading point, the import procedure at the discharge point and the transportation of the parts. In FIG. 1, it is assumed that the forwarder performing the export procedure and the forwarder performing the import procedure are different forwarders, which are denoted as "Export Forwarder" and "Import Forwarder".

The transaction administrator is a trader administrating the transaction of the parts between the vendor and the maker. The transaction management server is communicatively connected to computers of the maker, the vender and the forwarder respectively. The transaction administrator administrates the transaction of the parts between the vendor and the maker by using the transaction management server.

In FIG. 1, since flows of information, money and goods are depicted mixed for convenience of description, "the transaction administrator" and "the transaction management server" are depicted as if they are independent entities. However, as noted above, the transaction management server is a computer of the transaction administrator.

Figure 2:
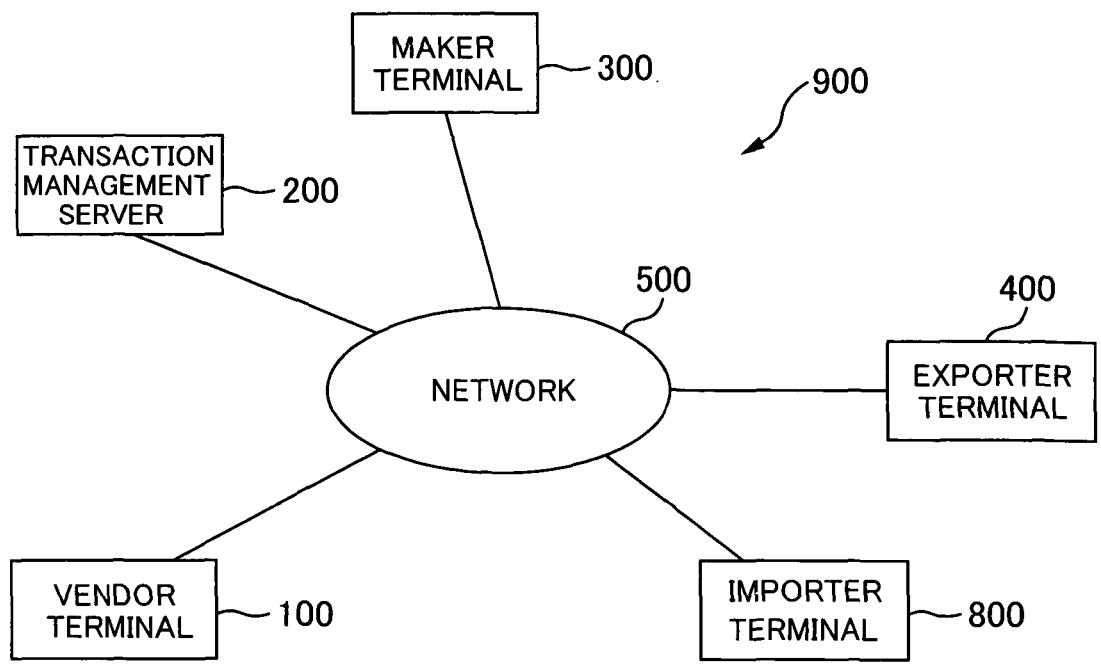
FIG. 2 is a diagram showing a system configuration according to the embodiment.

FIG. 2 shows how the transaction management server is connected communicatively to the computers respectively of the maker, the vendor and the forwarders. In FIG. 2, the vendor terminal 100 is a computer of the vendor. The transaction management server 200 is a computer of the transaction administrator. The maker terminal 300 is a computer of the maker. The exporter terminal 400 is a computer of the Export Forwarder (exporter). The importer terminal 800 is a computer of the Import Forwarder (importer). A transaction management system 900 is constituted by communicatively connecting these computers via a network 500.

In FIG. 1, the flow of the transaction of EMI is shown by the steps from "1. Forecast information" to "24. Financing reconcile registration". Details are described later.

===Configurations of Vendor Terminal, Transaction Management Server, Maker Terminal, Exporter Terminal and Importer Terminal===

Figure 3:
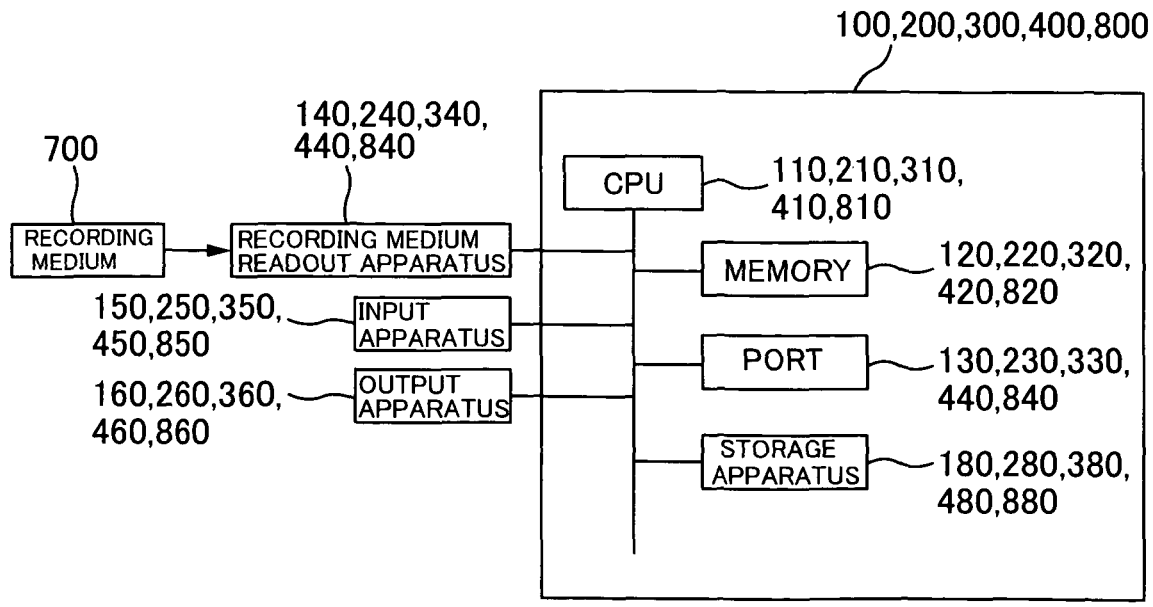
FIG. 3 is a diagram showing the configuration of each computer according to the embodiment.

Then, configuration is described of each of the vendor terminal 100, the transaction management server 200, the maker terminal 300, the exporter terminal 400 and the importer terminal 800. The vendor terminal 100, the transaction management server 200, the maker terminal 300, the exporter terminal 400 and the importer terminal 800 are computers and have basically the same hardware configuration. Therefore, those hardware configurations are represented by one block diagram, which is shown in FIG. 3.

<Transaction Management Server>

The transaction management server 200 is a computer comprising a CPU (Central Processing Unit) 210, a memory 220, a port 230, a recording medium readout apparatus 240, an input apparatus 250, an output apparatus 260 and a storage apparatus 280.

The CPU 210 is responsible for overall control of the transaction management server 200 and achieves various functions as the transaction management server 200 by reading out a transaction management server control program (corresponding to a program as defined in the claims) 1020 consisting of codes for performing various operations according to the embodiment stored in the storage apparatus 280 to the memory 220 and executing it. For example, by executing the transaction management server control program 1020 and by cooperating with hardware devices such as the memory 220, the port 230, the input apparatus 250, the output apparatus 260 and the storage apparatus, the CPU 210 achieves a transportation instruction receiver, a commodity price writer, a transportation instruction transmitter, a waybill identification information receiver, a waybill identification information writer, a payment information transmitter, a first commodity identification information receiver, a commodity identification information writer, a commodity delivery request receiver, a commodity delivery request transmitter, a second commodity identification information receiver, a payment request transmitter and a database, which are described in the claims. The memory 220 can consist of a semiconductor memory device, for example.

The recording medium readout apparatus 240 is an apparatus for reading programs and data recorded on a recording medium 700 such as a flexible disk, a magnetic tape and a compact disk. The read programs and data are stored in the memory 220 or the storage apparatus 280. Hence, for example, the transaction management server control program 1020 recorded on the recording medium 700 can be read out from the recording medium 700 by using the recording medium readout apparatus 240 and can be stored into the memory 220 or the storage apparatus 280. The recording medium readout apparatus 240 may be incorporated in the transaction management server 200 or may be provided external thereto.

Figure 4:
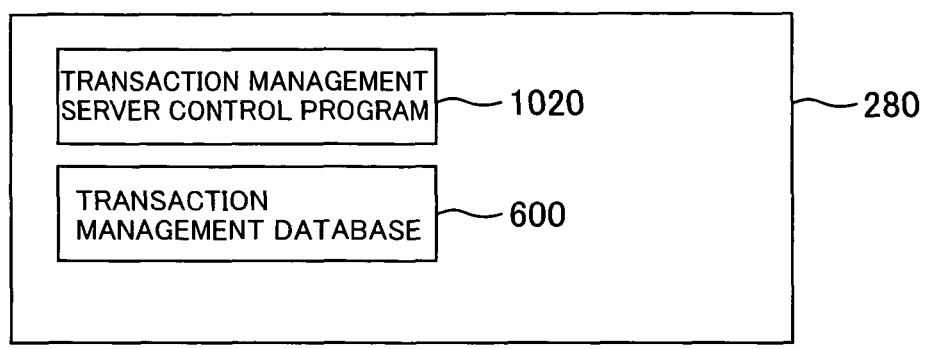
FIG. 4 is a diagram showing the configuration of a storage apparatus of a transaction management server according to the embodiment.

The storage apparatus 280 can be a hard disk apparatus, a semiconductor memory device or the like, for example. The storage apparatus 280 stores the transaction management server control program 1020 and a transaction management database (corresponding to a database described in the claims) 600. FIG. 4 shows how in the storage apparatus 280 are stored the transaction management server control program 1020 and a transaction management database 600.

The transaction management database 600 is a database for managing the transactions of parts between the vendor and the maker. The transaction management database 600 is shown in FIG. 5. FIG. 5 shows an example of the case of managing a transaction performed between a company A which is a vendor and a company X which is a maker, for a part denoted as ITEM-A. Details are described later.

The input apparatus 250 is an apparatus used for such as data input to the transaction management server 200 and acts as a user interface. For example, a keyboard or a mouse can be used as the input apparatus 250.

The output apparatus 260 is an apparatus for outputting information to the outside and acts as a user interface. For example, a display or a printer can be used as the output apparatus 260.

The port 230 is an apparatus for performing communication. The transaction management server 200 can communicate with the other computers, the vendor terminal 100, the maker terminal 300, the exporter terminal 400, the importer terminal 800 and the like via the network 500 through the port 230. For example, the transaction management server control program 1020 can be received from another computer through the port 230 via the network 500 and stored into the memory 220 or the storage apparatus 280.

<Vendor Terminal, Maker Terminal, Exporter Terminal and Importer Terminal>

The vendor terminal 100, the maker terminal 300, the exporter terminal 400 and the importer terminal 800 are provided with a CPU 110, 310, 410, 810, a memory 120, 320, 420, 820, a port 130, 330, 430, 830, a recording medium readout apparatus 140, 340, 440, 840, an input apparatus 150, 350, 450, 850, an output apparatus 160, 360, 460, 860 and a storage apparatus 180, 380, 480, 880, respectively.

The function of each of these apparatuses is the same as that of the corresponding apparatus provided in the transaction management server 200 described above.

The storage apparatuses 180, 380, 480, 880 of the vendor terminal 100, the maker terminal 300, the exporter terminal 400 and the importer terminal 800 store a vender terminal control program, a maker terminal control program, an exporter terminal control program and an importer terminal control program, respectively, which are executed by the CPUs 110, 310, 410, 810 to achieve the functions of the vendor terminal 100, the maker terminal 300, the exporter terminal 400, and the importer terminal 800 respectively.

===Process Flow in FMI===

Figure 6:
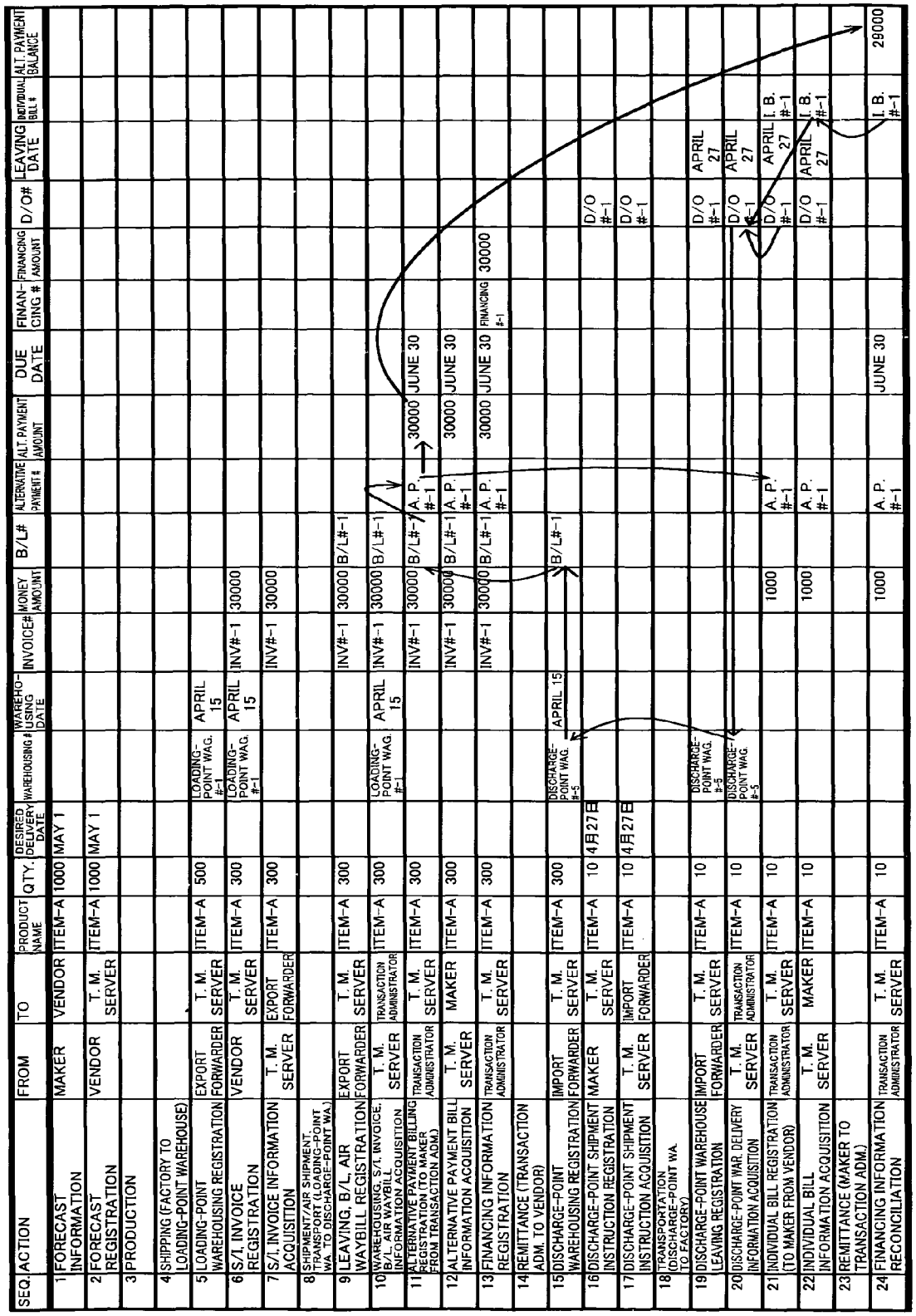
FIG. 6 is a view showing details of information sent and received among the computers according to the embodiment.
Figure 7:
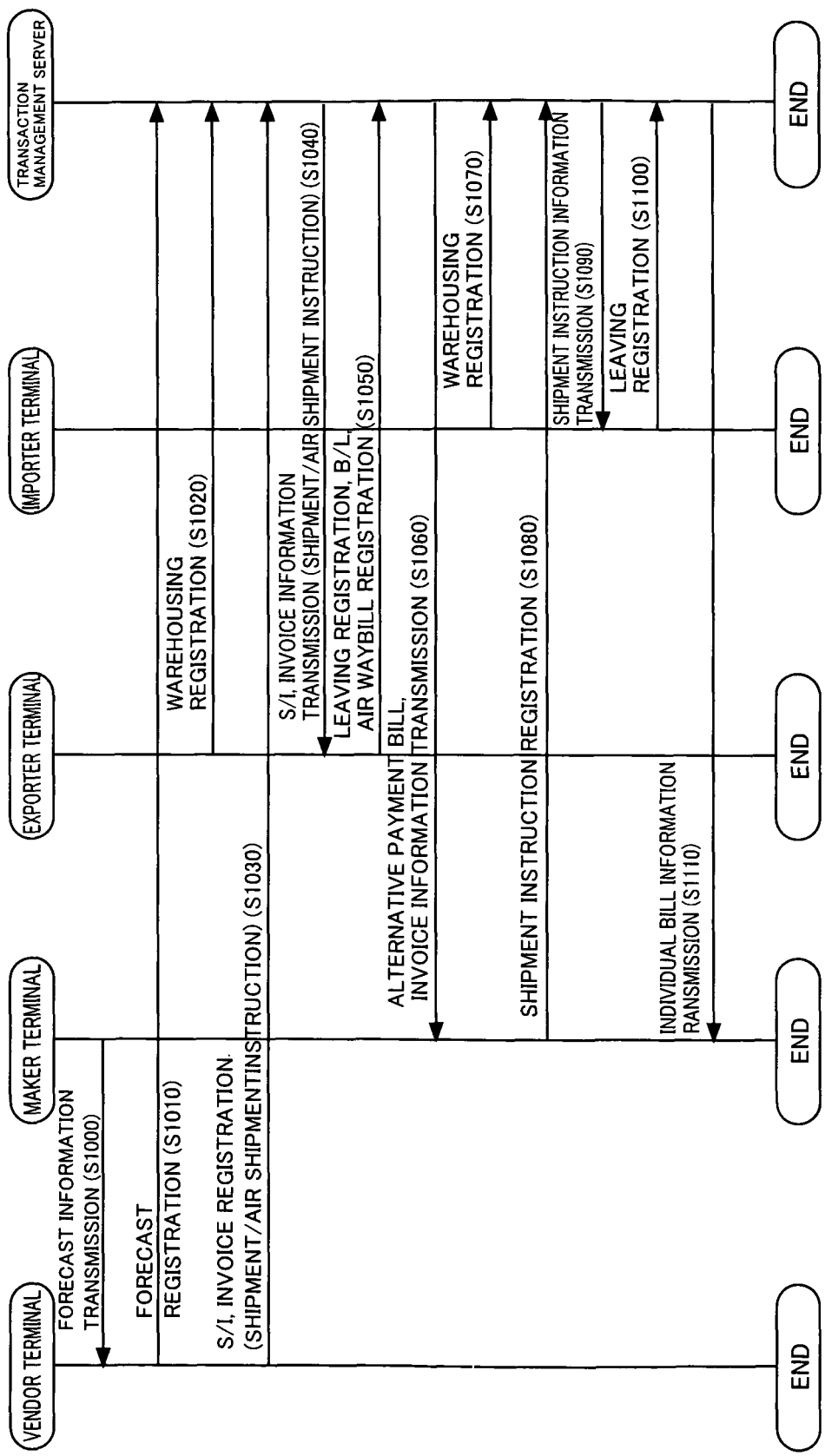
FIG. 7 is a flow chart showing flows of information sent and received among the computers according to the embodiment.

A process flow is described for the case that the transaction of parts is performed with FMI between the vendor and the maker in accordance with the steps of FIG. 1, with reference to FIGS. 5 to 7.

FIG. 1 shows a transaction flow in FMI including flows of information, a commodity and money. FIG. 7 shows flows of information among the computers. FIG. 6 shows the contents of the information sent and received among the computers. The numbers listed in the "Seq." column of FIG. 6 correspond to the respective step numbers of FIG. 1. FIG. 5 shows the transaction management database 600 stored in the transaction management server 200 for managing the transaction between the vendor and the maker.

First, the maker notifies the vendor of information about the production plan of a product (Forecast information) ("1. Forecast information"; S1000). The Forecast information is notified few months before the production of the product. The vendor produces parts based on the Forecast information obtained from the maker. As shown in FIG. 6, "product name", "quantity" and "desired delivery date" are included in the Forecast information.

Then, the vendor registers the Forecast information into the transaction management server 200 ("2. Forecast registration"; S1010). The registration of the Forecast information is performed by writing the pieces of information contained in "product name", "quantity" and "desired delivery date" fields of the Forecast information into "product name", "delivery quantity" and "desired delivery date" fields of the transaction management database 600. By registering the Forecast information containing the maker's production plan for until a few months further on into the transaction management server 200, the vendor can simulate the part production plan to estimate the number required in the future. Thus, the vendor can timely instruct to transport the parts in accordance with the maker's production plan.

The parts produced by the vendor are transported to a loading-point warehouse ("3. Production" "4. Shipping").

When the parts arrive at the loading-point warehouse, the exporter performs warehousing registration for the parts ("5. Warehousing registration"; S1020). As shown in FIG. 6, the warehousing registration is performed where based on pieces of information including "product name", "quantity", "warehousing number" and "warehousing date" transmitted from the exporter terminal 400 to the transaction management server 200, the transaction management server 200 retrieves the information having the same product name from the transaction management database 600 and writes the corresponding pieces of information into "warehousing quantity", "loading-point warehouse number" and "loading-point warehousing date" fields respectively.

On the other hand, the vendor instructs to ship the parts stored in the loading-point warehouse according to the inventory status of the parts stored in the loading-point warehouse. The shipping instruction is transmitted from the vendor terminal 100 to the transaction management server 200 ("6. S/I, Invoice registration"; S1030). As Shown in FIG. 6, "product name", "quantity", "warehousing number", "warehousing date", "invoice number" and "money amount (information indicating the price of the commodity)" are contained in the shipping instruction. Then, the invoice registration is performed where based on the information, the transaction management server 200 retrieves the information having the same product name, the same warehousing number and the same warehousing date from the transaction management database 600 and writes the corresponding pieces of information into "shipping quantity", "invoice number" and "commodity price" fields. After this point, the shipping instruction can be identified by the invoice number.

After the invoice registration, the transaction management server 200 transmits to the exporter terminal 400 invoice information containing the "product name", "quantity", "invoice number" and "price" ("7. S/I, Invoice information acquisition"; S1040). In this way, the shipping instruction to ship the parts (a ship instruction if shipped by a vessel or an air-ship instruction if shipped by an airplane) is made to the exporter. Then, a shipping company or an airline company ships or air-ships and transports the parts ("8. Shipment/Air shipment transport"). Although, in this embodiment, hereinafter, description is made for the case of transportation by a vessel, the same applies to the case of transportation by an airplane.

Then, the exporter performs leaving registration and B/L (Bill of Lading) registration ("9. Leaving registration, B/L, air waybill registration"; S1050). B/L is a waybill issued when the parts are loaded into a vessel and is a document of value assuring the exchange for the parts. A tag or sticker indicating the B/L number is affixed to the commodity loaded into a vessel. As shown in FIG. 6, the leaving registration and B/L registration is performed where the "product name", "quantity", "invoice number", "money amount" and "B/L number" are transmitted from the exporter terminal 400 to the transaction management server 200 and then the transaction management server 200 retrieves the information having the same invoice number from the transaction management database 600 and writes "B/L number" therein. If the transportation is performed by the use of an airplane instead of a vessel, the airline company issues an air waybill. Then, the exporter performs the air waybill registration as in the case of the B/L described above. A tag or sticker indicating the air waybill number is affixed to the parts loaded into the airplane. The transaction administrator can know that the parts are loaded into a vessel or an airplane by referring with the B/L number or the air waybill number.

From the pieces of information stored in the transaction management database 600, the transaction administrator can obtain the warehousing information, the invoice information and the B/L information about the part being transported from the vendor to the maker ("10. Warehousing information, S/I, Invoice, B/L, air waybill information acquisition"). These pieces of information are notified by sending an e-mail from the transaction management server 200 to the computer of an in-charge person of the transaction administrator, for example.

When the transaction administrator obtains the information, the transaction administrator issues a bill to the maker so as for the transaction administrator to pay for the parts being transported on behalf of the maker ("11. Alternative payment bill creation"). In the transaction management database 600, the number of the bill is written in an "alternative payment number" field; an amount billed is written in an "alternative payment amount" field; and a due date for payment is written in a "due date for payment" field. These pieces of information are transmitted from the transaction management server 200 to the maker terminal 300 ("12. Alternative payment bill and invoice information transmission"; S1060).

Subsequently, the transaction administrator gets financed based on receivables to the transaction administrator from the maker and performs the alternative payment for the parts to the vendor using the finances ("13. Financing information registration", "14. Remittance"). In this way, as is the case with FOB, the vendor can collect payment for the parts when the parts are shipped. Therefore, the vendor can avoid having the economic burden increased.

The transaction administrator can get financed by obtaining a loan from a finance institution such as a bank on security of receivables based on the bill of lading. The finance institution may sell the receivables in the market for liquidation and lend the obtained funds to the transaction administrator.

When financed, the transaction administrator registers in the transaction management server 200. The registering is performed by writing a "financing number" and "financing amount" into the transaction management database 600.

When the payment for the parts is performed from the transaction administrator to the vendor, information indicating that the payment has been performed is transmitted from the transaction management server 200 to the vendor terminal 100. By this means, the vendor can know that the payment for the parts has been performed.

When the transported parts arrive at the destination, the importer performs warehousing registration. ("15. Warehousing registration"; S1070). As shown in FIG. 6, the warehousing registration is performed where information including "product name", "quantity", "discharge-point warehousing number (commodity identification information)", "warehousing date" and "B/L number" is transmitted from the importer terminal 800 to the transaction management server 200 and where the transaction management server 200 retrieves the information having the same product name, the same quantity and the same B/L number from the transaction management database 600 and writes the corresponding pieces of information into "discharge-point warehousing number" and "discharge-point warehousing date" fields. The discharge-point warehousing number is a number assigned by the exporter when the parts arrive at the destination. The B/L number is the number written in the label of the commodity having arrived.

The transported parts are stored in the discharge-point warehouse. The inventory management is performed for the parts in the discharge-point warehouse under the responsibility of the vendor.

On the other hand, the maker ships the parts stored in the discharge-point warehouse in accordance with the production plan of the product. If the parts are shipped from the discharge-point warehouse, the maker terminal 30 performs shipment instruction registration with the transaction management server 200 ("16. Shipment instruction registration"; S1080). As shown in FIG. 6, the shipment instruction registration is performed where a part delivery request containing "product name", "quantity", "desired delivery date" and "D/O (Delivery Order) number" is transmitted from the maker terminal 300 to the transaction management server 200 and where the transaction management server 200 retrieves the information having the same product name from the transaction management database 600 and writes the corresponding pieces of information into "leaving quantity", "leaving date" and "D/O number" fields.

Then, the transaction management server 200 transmits the part delivery request to the importer terminal 800 ("17. Shipment instruction information acquisition"; S1090). Accordingly, the importer transports the parts stored in the discharge-point warehouse to the factory of the maker ("18. Transportation"). When the parts move out the door of the discharge-point warehouse, the parts become property of the maker. Also, the maker starts having an obligation to pay for the parts.

When the parts are shipped from the discharge-point warehouse, the importer performs leaving registration with the transaction management server 200 ("19. Leaving registration"; S1100). The leaving registration is performed where "product name", "quantity", "discharge-point warehousing number", "D/O number" and "leaving date" are transmitted from the importer terminal 800 to the transaction management server 200 and where the transaction management server 200 retrieves the information having the same product name, the same leaving quantity, the same leaving date, the same D/O number and the same discharge-point warehousing number and writes leaving completion information therein.

When the leaving registration is completed, the transaction administrator obtains the leaving information from the information stored in the transaction management database 600 ("20. Delivery information acquisition"). The transaction administrator charges the maker a payment for the shipped parts ("21. Individual bill registration"). The charging of the payment is performed by transmitting a payment request from the transaction management server 200 to the maker terminal 300 ("22. Individual bill information transmission"; S1110). The payment request contains "product name", "leaving quantity", "leaving money amount", "alternative payment number", "ID/O number", "leaving date" and "individual bill number" which are stored in the transaction management database 600. The leaving money amount is a payment asked to the maker and is calculated by adding predetermined fees, for example, to the price of the parts identified on the basis of the discharge-point warehousing number. The individual bill number is a number assigned in order to manage the bills to the maker.

The parts shipped to the maker can be identified by the shipment completion information and the discharge-point warehousing number. The bill may be sent to the maker each time parts are shipped or the bills for each month may be sent together on a monthly cutoff day. If parts are stored in the discharge-point warehouse for a prolonged period, the maker may be forced to receive the parts and may be charged a payment for the parts.

The transaction management database 600 stores information indicating the difference between the amount paid by the transaction administrator on behalf of the vender and the amount paid by the maker to the transaction administrator in an "alternative payment balance" field, and when the maker makes a payment ("23. Remittance"), the transaction management server 200 updates the amount in the "alternative payment balance" field ("24. Financing reconcile registration").

The embodiment has been described above, and according to the embodiment, sellers of commodities can receive payments when the commodities are loaded into transportation means, as is the case with FOB. Therefore, VMI can be implemented without increasing burdens on the seller. Also, buyers need only make payments for quantities of commodities shipped from warehouses, as is the case with VMI. The buyer can supply a necessary quantity of a commodity to the market when needed, without caring about the inventory. In this way, according to the embodiment, VMI can be implemented without increasing burdens on the commodity seller.

Although the embodiment of the present invention has been described hereinabove, the embodiment is intended to facilitate the understanding of the present invention and is not to be construed as limiting the present invention. The present invention may be modified and altered without departing from the spirit thereof and the present invention encompasses the equivalents thereof.

What is claimed is:

1. A control method for a transaction management server of a transaction administrator administrating commodity transactions between a seller and a buyer, the transaction management server being communicatively connected to a seller terminal of the seller of a commodity, to a buyer terminal of the buyer of the commodity, to an export forwarder terminal of an export forwarder to transport the commodity, and to an import forwarder terminal of an import forwarder to transport the commodity, wherein it is concluded as a contract in the transaction that the commodity is the property of the seller until the commodity is brought out from a discharge-point warehouse and obligation of the buyer to the seller is generated when the commodity is brought out from the discharge point-warehouse, the control method comprising the steps of the transaction management server:

writing into a database forecast information including a desired delivery date of the commodity, the forecast information containing a production plan of a buyer product, the buyer product being a product into which the buyer assembles the commodity;

writing into the database loading-point warehousing registration information including a loading-point warehousing date transmitted from the export forwarder terminal when the commodity arrives at a loading-point warehouse;

receiving a transportation instruction to transport the commodity from the loading-point warehouse along with information indicating a price of the commodity from the seller terminal;

writing into the database the information indicating the price of the commodity in association with the received transportation instruction;

transmitting the transportation instruction to the export forwarder terminal;

receiving from the export forwarder terminal, identification information of a waybill issued when the commodity is loaded from the loading-point warehouse into transportation means by the export forwarder according to the transportation instruction, wherein the waybill is a document of value assuring exchange for the commodity;

writing into the database the received identification information of the waybill in association with the transportation instruction;

transmitting to the seller terminal, information indicating that the transaction administrator has made a payment for the commodity to the seller on behalf of the buyer, wherein the transaction management server transmits to the seller terminal information indicating that the payment for the commodity to the seller on behalf of the buyer by the transaction administrator was financed by a finance institution on security of receivables based on the waybill;

receiving from the import forwarder terminal, commodity identification information assigned to the commodity by the import forwarder when the commodity has arrived at the discharge-point warehouse along with the identification information of the waybill put on the commodity;

writing into the database the received commodity identification information in association with the transportation instruction stored in association with the received identification information of the waybill;

writing into the database discharge-point warehousing date information indicating a date of arrival at the discharge-point warehouse in association with the transportation instruction;

receiving from the buyer terminal a commodity delivery request requiring delivery of the commodity from the discharge-point warehouse to a factory of the buyer;

transmitting the commodity delivery request to the import forwarder terminal;

receiving from the import forwarder terminal delivered commodity identification information of the commodity delivered from the discharge-point warehouse by the import forwarder to the buyer;

transmitting to the buyer terminal a payment request asking payment for the commodity paid by the transaction administrator on behalf of the buyer, the transmitted payment request including a payment amount, the payment amount calculated by adding predetermined fees to the price of the commodity stored in the database in association with the received commodity identification information; and when a prolonged period passes from the date of arrival at the discharge-point warehouse, as indicated by the discharge-point warehousing date information, transmitting to the buyer terminal a request asking the buyer to receive the commodity.

2. The control method for a transaction management server of claim 1, wherein the transportation instruction is a shipping instruction, wherein the transportation means is a vessel or an airplane, and wherein the waybill is a bill of lading or an air waybill.

3. The control method for a transaction management server of claim 1, wherein the database stores information indicating a difference between a money amount paid by the transaction administrator to the seller and a money amount paid by the buyer to the transaction administrator.

4. A transaction management server of a transaction administrator administrating commodity transactions between a seller and a buyer, the transaction management server being communicatively connected to a seller terminal of the seller of a commodity, to a buyer terminal of the buyer of the commodity, to an export forwarder terminal of an export forwarder to transport the commodity, and to an import forwarder terminal of an import forwarder to transport the commodity, wherein it is concluded as a contract in the transaction that the commodity is the property of the seller until the commodity is brought out from a discharge-point warehouse and obligation of the buyer to the seller is generated when the commodity is brought out from the discharge point-warehouse, the transaction management server comprising:
a processor;
memory coupled to the processor; and
a storage device storing a program which, when executed, causes the transaction management server to perform actions comprising:

writing into a database forecast information including a desired delivery date of the commodity, the forecast information containing a production plan of a buyer product, the buyer product being a product into which the buyer assembles the commodity;

writing into the database loading-point warehousing registration information including a loading-point warehousing date transmitted from the export forwarder terminal when the commodity arrives at a loading-point warehouse;

receiving a transportation instruction to transport the commodity from the loading-point warehouse along with information indicating a price of the commodity from the seller terminal;

writing into the database the information indicating the price of the commodity in association with the received transportation instruction;

transmitting the transportation instruction to the export forwarder terminal;

receiving from the export forwarder terminal; identification information of a waybill issued when the commodity is loaded from the loading-point warehouse into transportation means by the export forwarder according to the transportation instruction, wherein the waybill is a document of value assuring exchange for the commodity;

writing into the database the received identification information of the waybill in association with the transportation instruction;

transmitting to the seller terminal, information indicating that the transaction administrator has made a payment for the commodity to the seller on behalf of the buyer, wherein the transaction management server transmits to the seller terminal information indicating that the payment for the commodity to the seller on behalf of the buyer by the transaction administrator was financed by a finance institution on security of receivables based on the waybill;

receiving from the import forwarder terminal, commodity identification information assigned to the commodity by the input forwarder when the commodity has arrived at the discharge-point warehouse-along with the identification information of the waybill put on the commodity;

writing into the database the received commodity identification information in association with the transportation instruction stored in association with the received identification information of the waybill;

writing into the database discharge-point warehousing date information indicating a date of arrival at the discharge-point warehouse in association with the transportation instruction;

receiving from the buyer terminal a commodity delivery request requiring delivery of the commodity from the discharge-point warehouse to a factory of the buyer;

transmitting the commodity delivery request to the import forwarder terminal;

receiving from the import forwarder terminal delivered commodity identification information of the commodity delivered by the import forwarder to the buyer;

transmitting to the buyer terminal a payment request asking payment for the commodity paid by the transaction administrator on behalf of the buyer, the transmitted payment request including a payment amount, the payment amount calculated by adding predetermined fees to the price of the commodity stored in the database in association with the received commodity identification information; and when a prolonged period passes from the date of arrival at the discharge-point warehouse, as indicated by the discharge-point warehousing date information, transmitting to the buyer terminal a request asking the buyer to receive the commodity.

5. A machine readable recording medium storing a program for a transaction management server of a transaction administrator administrating commodity transactions between a seller and a buyer, the transaction management server being communicatively connected to a seller terminal of the seller of a commodity, to a buyer terminal of the buyer of the commodity, to an export forwarder terminal of an export forwarder to transport the commodity, and to an import forwarder terminal of an import forwarder to transport the commodity, wherein it is concluded as a contract in the transaction that the commodity is the property of the seller until the commodity is brought out from a discharge-point warehouse and obligation of the buyer to the seller is generated when the commodity is brought out from the discharge point-warehouse, the program, when executed, causing the transaction management server to perform actions comprising:

writing into a database forecast information including a desired delivery date of the commodity, the forecast information containing a production plan of a buyer product, the buyer product being a product into which the buyer assembles the commodity;

writing into the database loading-point warehousing registration information including a loading-point warehousing date transmitted from the export forwarder terminal when the commodity arrives at a loading-point warehouse;

receiving a transportation instruction to transport the commodity from the loading-point warehouse along with information indicating a price of the commodity from the seller terminal;

writing into the database the information indicating the price of the commodity in association with the received transportation instruction;

transmitting the transportation instruction to the export forwarder terminal;

receiving from the export forwarder terminal, identification information of a waybill issued when the commodity is loaded from the loading-point warehouse into transportation means by the export forwarder according to the transportation instruction, wherein the waybill is a document of value assuring exchange for the commodity;

writing into the database the received identification information of the waybill in association with the transportation instruction;

transmitting to the seller terminal, information indicating that the transaction administrator has made a payment for the commodity to the seller on behalf of the buyer, wherein the transaction management server transmits to the seller terminal information indicating that the payment for the commodity to the seller on behalf of the buyer by the transaction administrator was financed by a finance institution on security of receivables based on the waybill;

receiving from the import forwarder terminal, commodity identification information assigned to the commodity by the import forwarder when the commodity has arrived at the discharge-point warehouse along with the identification information of the waybill put on the commodity;

writing into the database the received commodity identification information in association with the transportation instruction stored in association with the received identification information of the waybill;

writing into the database discharge-point warehousing date information indicating a date of arrival at the discharge-point warehouse in association with the transportation instruction;

receiving from the buyer terminal a commodity delivery request requiring delivery of the commodity from the discharge-point warehouse to a factory of the buyer;

transmitting the commodity delivery request to the import forwarder terminal;

receiving from the import forwarder terminal delivered commodity identification information of the commodity delivered by the import forwarder to the buyer;

transmitting to the buyer terminal a payment request asking payment for the commodity paid by the transaction administrator on behalf of the buyer, the transmitted payment request including a payment amount, the payment amount calculated by adding predetermined fees to the price of the commodity stored in the database in association with the received commodity identification information; and when a prolonged period passes from the date of arrival at the discharge-point warehouse, as indicated by the discharge-point warehousing date information, transmitting to the buyer terminal a request asking the buyer to receive the commodity.

* * * * *